US006837366B2

(12) United States Patent
Nishikita

(10) Patent No.: US 6,837,366 B2
(45) Date of Patent: Jan. 4, 2005

(54) REINFORCING BAND FOR CONVEYOR BELTS, AND CONVEYOR BELT USING THE SAME

(75) Inventor: Yukinobu Nishikita, Tokyo (JP)

(73) Assignee: Bridgestone Corporation (JP)

( * ) Notice: Subject to any disclaimer, the term of this patent is extended or adjusted under 35 U.S.C. 154(b) by 0 days.

(21) Appl. No.: 10/312,976

(22) PCT Filed: Jun. 13, 2001

(86) PCT No.: PCT/JP01/05019

§ 371 (c)(1),
(2), (4) Date: Feb. 19, 2003

(87) PCT Pub. No.: WO02/00531

PCT Pub. Date: Jan. 3, 2002

(65) Prior Publication Data

US 2003/0155215 A1 Aug. 21, 2003

(30) Foreign Application Priority Data

Jun. 28, 2000 (JP) ....................................... 2000-193791

(51) Int. Cl.[7] .............................................. B65G 15/34
(52) U.S. Cl. ....................................................... 198/847
(58) Field of Search .......................................... 198/847

(56) References Cited

U.S. PATENT DOCUMENTS

| | | | | |
|---|---|---|---|---|
| 2,633,227 A | * | 3/1953 | Hutchins ................... | 198/847 |
| 3,612,256 A | * | 10/1971 | Limbach et al. ............ | 198/847 |
| 4,094,402 A | * | 6/1978 | Heeke ......................... | 198/847 |
| 4,543,080 A | * | 9/1985 | Tangorra ..................... | 474/204 |
| 4,572,359 A | * | 2/1986 | Fujita et al. ................. | 198/819 |
| 4,928,812 A | * | 5/1990 | van Calker et al. ......... | 198/847 |
| 5,164,241 A | * | 11/1992 | Andre De La Porte et al. .. | 428/97 |
| 5,422,165 A | * | 6/1995 | Arnold ........................ | 428/192 |
| 5,460,261 A | * | 10/1995 | Kusel et al. ................. | 198/819 |

* cited by examiner

Primary Examiner—Joe Dillon, Jr.
(74) Attorney, Agent, or Firm—Ostrolenk, Faber, Gerb & Soffen, LLP

(57) ABSTRACT

A durable reinforcing band for conveyer belts wherein a reinforcing band (3) is formed by interweaving a number of hard cords (6) facing a direction orthogonal to the longitudinal direction and longitudinally spaced at predetermined intervals with a number of longitudinally directed warp yarns (7) in such a manner as to prevent longitudinal shift, the reinforcing band (3) being disposed on the upper or lower surface of a core (2) composed of canvas or the like and being then surrounded by rubber (5), thereby forming a belt (1), and wherein the transverse stiffness and shape retainability of the belt can be enhanced by arranging the hard cords in a direction orthogonal to the longitudinal direction of the belt, and moreover, the hard cords are prevented from shifting longitudinally of the belt; and a conveyer belt, particularly pipe conveyer belt, using the same.

2 Claims, 4 Drawing Sheets

REINFORCING BAND FOR CONVEYOR BELTS, AND CONVEYOR BELT USING THE SAME

BACKGROUND OF THE ART

The present invention relates to a reinforcing band for conveyor belts and a conveyor belt using the same.

In a tubular belt conveyor in which an endless flat belt is partially wound to form a tube in which loads are put and conveyed, long use decreases the quality of the belt to break the tubular form and cause twisting so as to open a closed portion, so that loads are likely to escape therefrom.

To prevent such accident, a known conveyor belt, especially a tubular conveyor belt, includes various cores and reinforcing bands.

Canvases are generally used as cores or reinforcing bands in such a known belt. In a known canvas, a weft is meandered to provide lateral elasticity, so that it is likely to deviate in a direction perpendicular to a running direction of the belt when the belt is used, thereby decreasing lateral rigidity of the belt to involve decrease in shape maintenance function.

It is suggested that rigid cords such as wires are embedded longitudinally of a belt. If they are embedded longitudinally of the belt, running resistance of the belt is increased when a tension roller runs. If they are embedded transversely of the belt, a number of correction rollers are likely to deviate longitudinally of the belt when they pass.

SUMMARY OF THE INVENTION

In view of the foregoing disadvantages in the prior art, it is an object to provide a durable reinforcing band of a conveyor belt and a conveyor belt having it, especially a tubular conveyor belt, in which rigid cords are provided transversely of the belt to increase lateral rigidity and shape maintenance capability of the belt and to prevent the rigid cords from deviating longitudinally of the belt.

According to the present invention, the foregoing disadvantages are solved as below.

In a reinforcing band of a conveyor belt, a plurality of rigid cords spaced from each other transversely are woven together with a plurality of warps not to deviate them longitudinally.

In manufacturing of the conveyor belt, the reinforcing band is provided longitudinally of the belt, so that a plurality of rigid cords are provided transversely of the belt to increase lateral rigidity and shape maintenance capability of the belt. In addition, the warps are woven with the rigid cords to prevent the rigid cords from deviating longitudinally of the belt when the belt passes on the guide roller.

In manufacturing of the tubular conveyor belt, the reinforcing band is provided longitudinally of the belt, so that a plurality of rigid cords are directed transversely of the belt. When the belt is rolled up into a tubular shape, the rigid cords are formed as ribs to keep the tubular shape for a long time and the rigid cords are made to have the same pitch by the warps, thereby preventing the rigid cords from diviating longitudinally of the belt when the belt passes through the correction rollers.

BRIEF DESCRIPTION OF THE DRAWINGS

The features and advantages of the present invention will become more apparent from the following description with respect to embodiments as shown in accompanying drawings wherein.

DETAILED DESCRIPTION OF PREFERRED EMBODIMENTS

An embodiment of the present invention will be described with respect to accompanying drawings as below.

Figure 1:
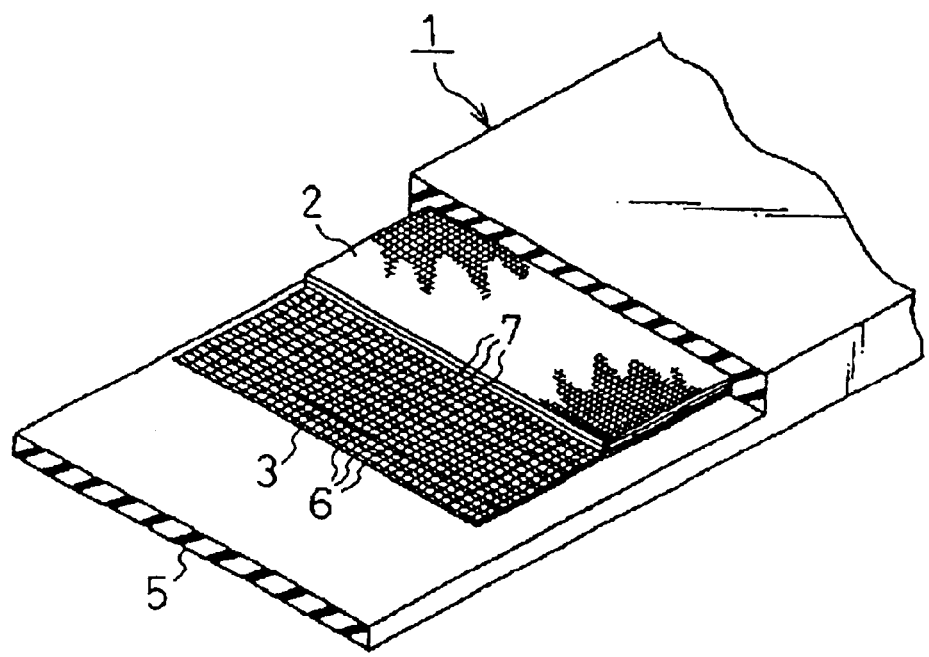
FIG. 1 is a partially cut-away perspective view of one embodiment of a conveyor belt according to the present invention.
Figure 2:
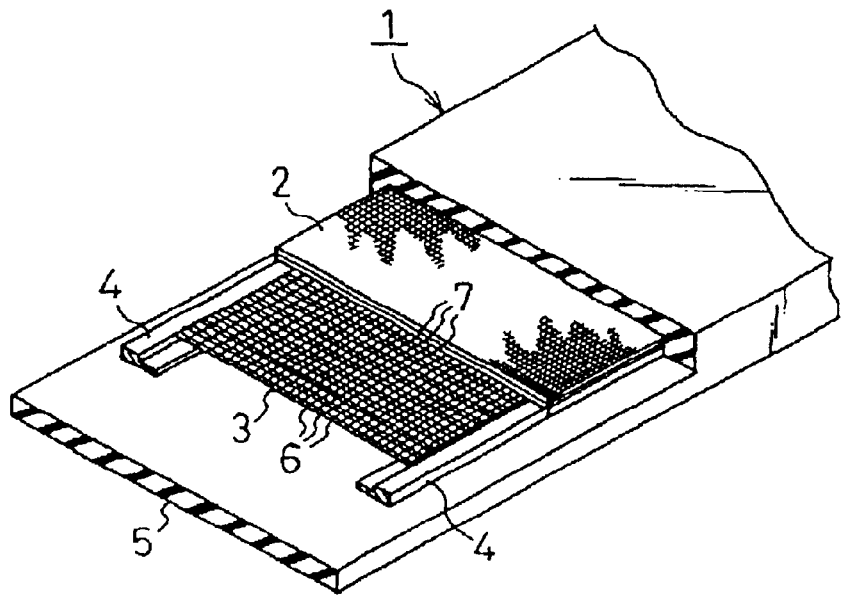
FIG. 2 is a partially cut-away perspective view of one embodiment of a tubular conveyor belt according to the present invention.

FIG. 1 is a partially cut-away perspective view of an embodiment of a conveyor belt according to the present invention, and FIG. 2 is a partially cut-away perspective view of an embodiment of a conveyor belt according to the present invention.

In belts 1,1', on the lower surface of a core 2 in which a plurality of canvases are laminated, a slightly narrower reinforcing band 3 is overlapped. In a tubular belt conveyor in FIG. 2, the reinforcing band 3 is supported by a pair of thickness-adjusting breakers 4, and these elements are surrounded by a rubber layer 5.

In the reinforcing band 3, a plurality of rigid cords 6 spaced from each other are provided transversely with respect to a longitudinal direction of the belts 1,1', and a plurality of warps are woven with the rigid cords 5 so that the warps are not to move longitudinally.

The rigid cords 6 may be made of synthetic fibers, aramid fibers or steel to provide rigidity, flexibility and elasticity enough to keep its shape when the belt 1 is rolled up into a trough or pipe.

The warps 7 may be made of synthetic fibers or aramid fibers which have smaller diameter than that of the rigid cord 6.

Figure 3:
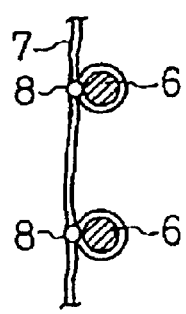
FIG. 3 is a vertical sectional view showing the fabric structure of a reinforcing band of a conveyor belt according to the present invention.
Figure 4:
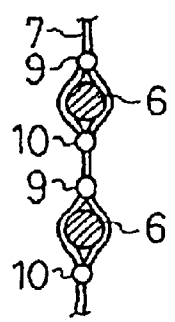
FIG. 4 is a vertical sectional view showing another embodiment of the fabric structure of a reinforcing band.

As shown in FIG. 3, the warp 7 is wound on the rigid cord 6 which serves as a weft at an intersection to tie a single knot 8, or as shown in FIG. 4, the rigid cord 6 is held between two knots 9, 10 of the warp 7.

Figure 5:
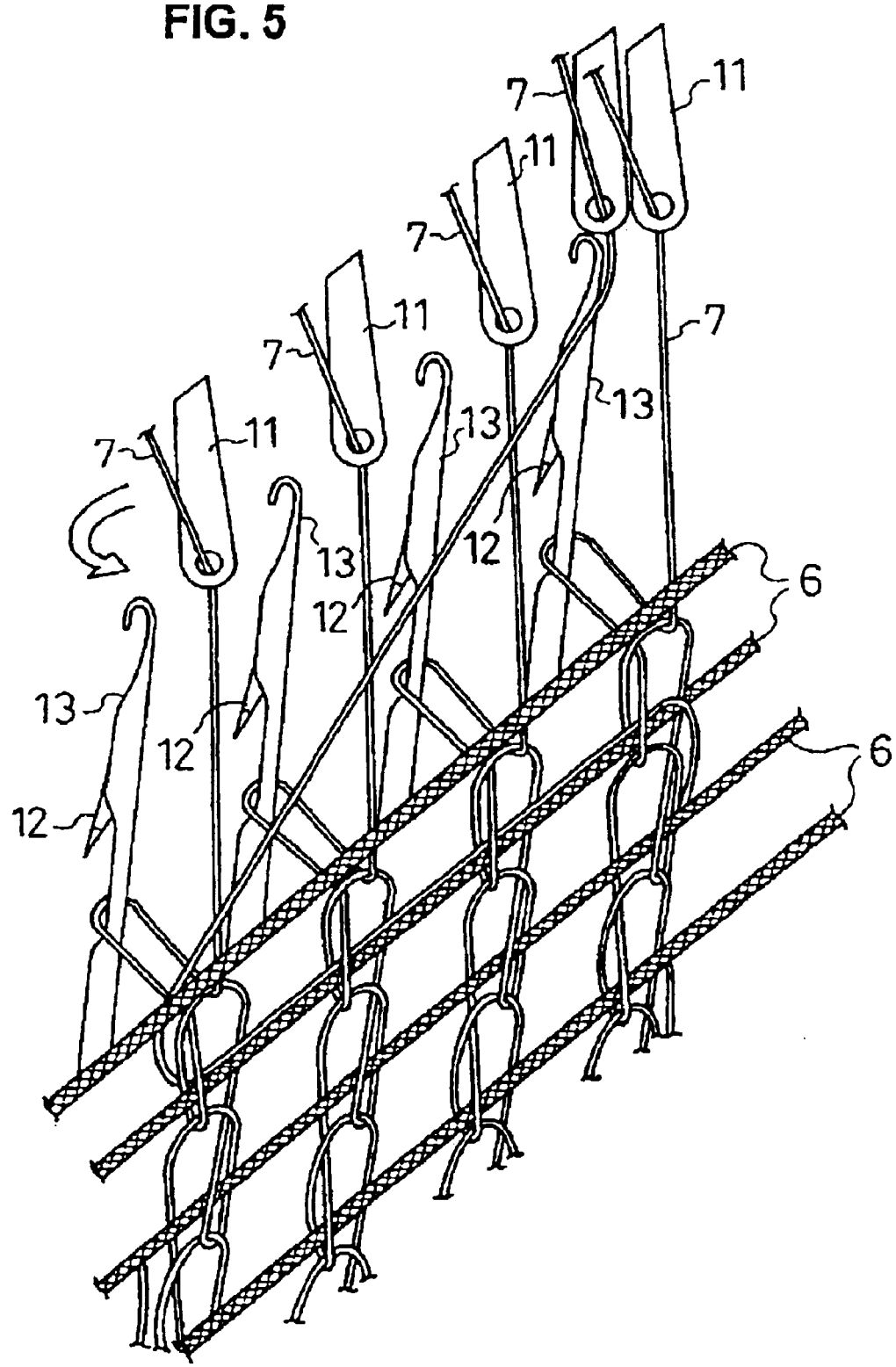
FIG. 5 is a perspective view showing one embodiment of how to weave the reinforcing band.

FIG. 5 illustrates how to weave the reinforcing band 3 in detail. In this example, a plurality of warps 7 are twisted on rigid cords 6 as wefts by guide bars 11 and hooks 13 with covers 12 so that the rigid cords 6 may be straight lines.

By such fabric structure, each of the rigid cords 6 is prevented from deviating in a longitudinal direction of the reinforcing band 3.

Figure 6:
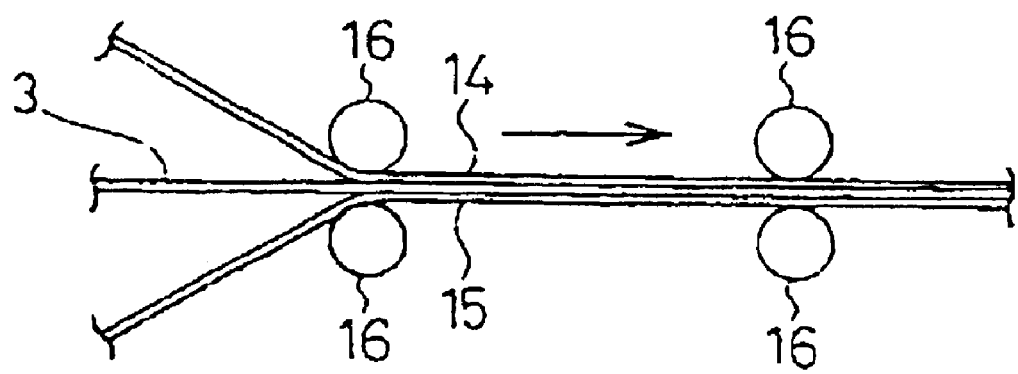
FIG. 6 is a vertical sectional view showing that thin rubber layers are formed on the upper and lower surfaces of the reinforcing band.

FIG. 6 shows that the reinforcing band 3 formed as above is tightened in a longitudinal direction. Thin band-like rubber layers 14, 15 are pressed by two pairs of upper and lower pressing rollers 16, 16 and bonded by adhesive (not shown). Each surface of the reinforcing band 3 is covered with rubber layers 14, 15. Thus, when the core 2 is put on the reinforcing band 3 and held by the rubber layer 5 to form the belts 1,1', the relationship between the rigid cord 6 and the warp 7 is not broken to facilitate manufacturing and improve quality.

The formation of the rubber layers 14,15 on each surface of the reinforcing band 3 is not limited to bonding as above, but another way such as vulcanization is also applicable.

The foregoing merely relates to embodiments of the present invention. Various modifications and changes may be made by a person skilled in the art without departing from the scope of claims wherein:

What is claimed is:

1. A conveyor belt, comprising:

a belt core that includes a canvas and an upper surface and a lower surface;

a reinforcing band that comprises a plurality of wefts, each of the wefts being made of a rigid cord, said wefts being spaced from one another and extending transversely to a length of the belt so as to be substantially straight, said band further comprising a plurality of warps each respectively woven with said plurality of wefts so as to form a mechanical woven structure, each of said warps being tied together with each of said wefts by at least one respective knot in the warps at each of the wefts;

a pair of breakers, each of the breakers being arranged to support a respective lateral side edge of the reinforcing band; and a rubber layer that surrounds the reinforcing band and said pair of breakers.

2. A conveyor belt as defined in claim 1, wherein the belt is rolled up so as to be usable as a tubular belt conveyor.

* * * * *